United States Patent [19]

Wherry

[11] 4,359,686
[45] Nov. 16, 1982

[54] METAL DETECTION APPARATUS WITH BASKET

[76] Inventor: Kenneth Wherry, Box 433, Faulkton, S. Dak. 57438

[21] Appl. No.: 164,359

[22] Filed: Jun. 30, 1980

[51] Int. Cl.$^3$ ............................ G01V 3/11; B03C 1/30; E02F 3/02
[52] U.S. Cl. ..................................... 324/326; 37/137; 209/38
[58] Field of Search .............................. 324/326–329, 324/67; 37/DIG. 1, DIG. 19, 118 R, 137, 1; 209/38, 1, 417–419

[56] References Cited

U.S. PATENT DOCUMENTS

| | | | |
|---|---|---|---|
| 528,607 | 11/1894 | Peat | 37/137 X |
| 661,774 | 11/1900 | Sheehy et al. | |
| 1,050,305 | 1/1913 | Smith | 37/137 X |
| 1,782,497 | 11/1930 | Anderson | |
| 3,757,501 | 9/1973 | Bennett et al. | 324/326 X |
| 3,851,763 | 12/1974 | Ball et al. | |
| 3,907,136 | 9/1975 | Christides et al. | 324/67 X |
| 3,930,324 | 1/1976 | Wightman et al. | 324/329 X |
| 3,976,564 | 8/1976 | Holder | |
| 4,283,681 | 8/1981 | Kazuomi et al. | 324/326 |

*Primary Examiner*—Gerard R. Strecker
*Attorney, Agent, or Firm*—Kinney, Lange, Braddock, Westman and Fairbairn

[57] ABSTRACT

A metal detection apparatus that detects metal objects includes a nonmetallic basket in which the metal objects are retrieved. The nonmetallic basket has a top portion, a side wall portion, an open bottom and a blade portion for scooping material into the basket through the open bottom. The basket is attached to one end of a handle. A metal detection coil for detecting the metal objects is pivotally mounted with respect to the basket so that the metal detection coil is normally in a first search position proximate and at least partially covering the open bottom for detecting metal objects, and pivots to a second position within the basket as the basket fills with dirt and other material. The basket preferably has apertures in the top portion so that the basket, when inverted, can sift the material for metal objects.

10 Claims, 6 Drawing Figures

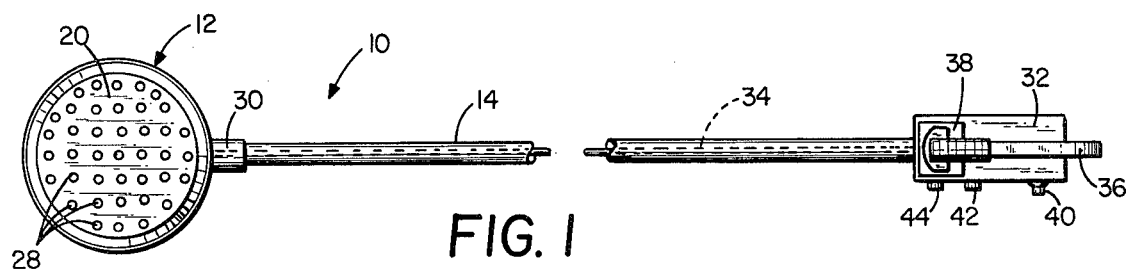
FIG. 1
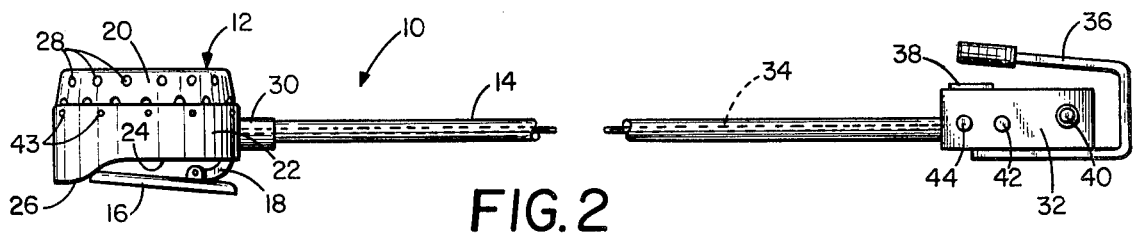
FIG. 2
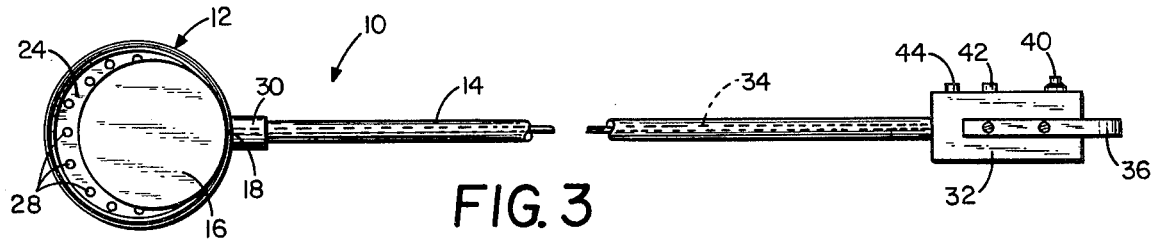
FIG. 3
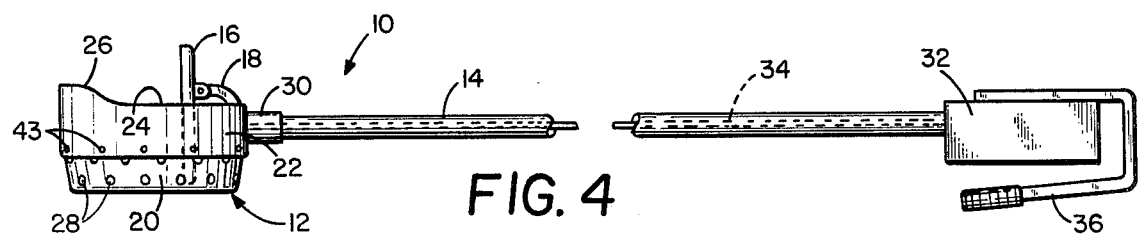
FIG. 4
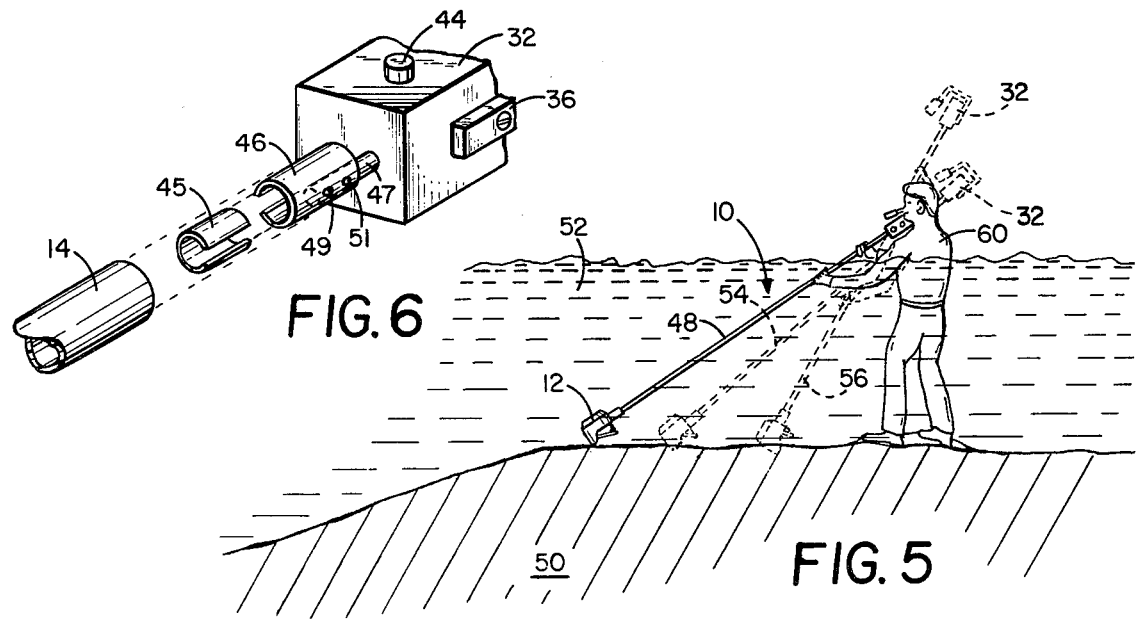
FIG. 6
FIG. 5 ized by reference numeral 10 in the Figures. Metal detection apparatus 10 includes a basket

METAL DETECTION APPARATUS WITH BASKET

BACKGROUND OF THE INVENTION

1. Field of the Invention

The present invention relates to metal detection apparatus, and in particular, to metal detection apparatus that detects and retrieves metal objects.

2. Description of the Prior Art

Searching for previous metal objects, old coins, and other metal artifacts with an electronic metal detector has become a popular hobby and pastime. The metal detector normally includes a coil attached to a handle in which the coil is passed closely over the ground or in the case of water, closely near the bottom of a lake or stream, to detect the location of a metal object.

Two problems have arisen in the use of metal detectors. The first problem is the constant bending to pick up every metal object that the detector detects to determine the identity of the object. This problem can be quite annoying when searching for lost coins and rings in an area such as a beach that includes a great quantity of other metal objects, such as pull tabs and bottle caps from soda containers. The second problem arises in using the metal detector under water. After the metal object has been detected, it is difficult to reestablish the exact location of the detection, and any disturbance of the bottom of the lake or stream will cloud the water and further complicate the retrieval of the metal object. Furthermore, the deeper the water in the lake or stream, the more difficult it becomes to reestablish the location of the detection of the metal object.

The prior art shows several patents that attempt to solve the problem of recovering an object from loose ground. These patents include: Sheehy et al. U.S. Pat. No. 661,774 entitled "Prospecting Shovel"; Anderson U.S. Pat. No. 1,782,497 entitled "Clam Catching Implement"; and Ball et al. U.S. Pat. No. 851,763 entitled "Combination Spade or Shovel and Sifter". The three patents mentioned above show some sort of scoop or shovel having screens or apertures to permit sifting for separating objects found on and in the ground. None of the inventions of the above cited patents mention the use of a metal detector in conjunction with a scoop or shovel.

The Holder U.S. Pat. No. 3,976,564 shows a perforated scoop to be used in conjunction with a metal detector. The scoop still requires the operator to bend over to retrieve the object, due to the short handle. Further, the metal detector has to be moved from the detection location to operate the scoop, resulting in the problem of relocating the metal object, even when using sophisticated discriminating detectors.

There is a need to provide an apparatus that detects metal objects and can be used to retrieve the metal object upon detection, especially in deep water.

SUMMARY OF THE INVENTION

The present invention is an apparatus that includes a nonmetallic basket attached to a handle. The nonmetallic basket has a top portion, a side wall portion, an open bottom and a blade portion for scooping material into the basket through the open bottom. A metal detection coil is pivotally mounted in a first search position proximate and at least partially covering the open bottom of the basket. The metal detection coil pivots to a second position within the basket as the basket fills with material.

If the basket is filled without the metal detection coil indicating the presence of metal objects, the contents of the basket can be dumped. If, on the other hand, the metal detection coil has indicated the presence of a metal object, the operator can inspect the contents of the basket for metal objects of value. To assist the operator, in preferred embodiments of the present invention to top portion of the basket is perforated to permit sifting of the contents of the basket when the basket is in an inverted position.

BRIEF DESCRIPTION OF THE DRAWINGS

FIG. 1 is a top view of the preferred embodiment of the present invention.

FIG. 2 is a side view showing the detection coil in a first search position when the basket is essentially empty.

FIG. 3 is a bottom view showing the detector coil positioned over the open bottom of the basket.

FIG. 4 is a side view showing the present invention in an inverted position with the detection coil in a second position when the basket is filled.

FIG. 5 is a pictorial illustration of the present invention in use.

FIG. 6 is a perspective view of a preferred method of attaching the handle and housing.

DETAILED DESCRIPTION OF THE PREFERRED EMBODIMENTS

A metal detection apparatus of the present invention is generally indicated by reference numeral 10 in the Figures. Metal detection apparatus 10 includes a basket 12, a handle 14, a metal detection coil 16 and pivotal mount 18.

Basket 12 includes a top portion 20, side wall portion 22, open bottom 24 and a blade portion 26 extending from the side wall portion 22. Top portion 20 preferably has a plurality of apertures 28, while the blade portion 26 and sidewall portion 22 preferably have no apertures. Basket 12 may be made of any nonmetallic material to avoid interference with operation of the metal detection coil 16. Preferably, the basket is made of a plastic material, since plastic will not interfere with the operation of the metal detection coil, and is noncorrosive and light in weight. Preferably the plastic is polyvinylchloride, which is stable both in fresh and salt water. The basket 12 may be made of one integral piece of material or may be constructed of an individual top portion 20 fixedly attached to the side wall portion 22.

Handle 14 is preferably made of a plastic conduit and more preferably the handle 14 is made of polyvinylchloride pipe, although any nonmetallic or metallic conduit may be used. Plastic is preferred because it is lightweight and durable. Handle 14 is fixedly attached to basket 12 in any standard manner to the side wall portion 22 of the basket 12. In the preferred embodiment shown in FIGS. 1 through 4, the handle is attached to basket 12 by a collar 30 which in turn is adhesively attached to both basket 12 and handle 14. Collar 30 is also preferably made from polyvinylchloride, and the adhesive used is one suitable for the bonding of polyvinylchloride.

Metal detection coil 16 is pivotally mounted by pivotal mount 18 preferably to basket 12. The metal detection coil 16 is shown in FIGS. 1 through 5 as having a solid exterior in the shape of a circular pad, such as a Garrett 8 inch diameter co-planar coil manufactured by Garrett Electronics. Other exterior configurations of metal detection coils are contemplated with the present invention, such as doughnut shaped exteriors and dual coil systems such as Garrett 8 inch co-axial searchcoil or a Model 11066 dual coil by Garrett Electronics. Preferably, the metal detection coil 16 is designed for underwater use in order to fully realize the advantages of the present invention.

The pivotal mount 18 is preferably made of a nonmetallic material and preferably the nonmetallic material is a plastic such as polyvinylchloride. The pivotal mount 18 in the preferred embodiment is fixedly attached to an inside wall of the side wall portion 22 on a side opposite and proximate to the handle 14. Both handle 14 and pivotal mount 18 are located on a side of the basket means opposite blade portion 26. Pivotal mount 18 is preferably attached to the side wall portion 27 by means of nylon screws (not shown), although other mechanical fasteners or adhesive systems may be used. The pivotal mount 18 preferably holds the detection coil 16 outside and parallel to the open bottom 24 essentially covering the bottom 24 in a first search position as shown in FIG. 2. As the basket fills with material due to the scraping action of blade portion 26, detection coil 16 pivots to a second position as shown in FIG. 4.

Metal detection circuitry is enclosed in housing 32 and represents the typical circuitry used to power metal detection coil 16 and receive signals therefrom for determination of the presence of metal objects. The metal detection circuitry is electrically connected by conductors 34 to metal detection coil 16. Conductors 34 preferably run from housing 32 within the handle 14 into the interior of basket 12 to metal detection coil 16. Housing 32 preferably has a carrying handle 36, a view meter 38, and controls 40, 42 and 44 and other exterior features that are found in commercially available metal detector housings. Typical commercially available circuitry with housing include "Coin Hunter A.D.S. Ground Hog" Model 11100 and "Master Hunter A.D.S. Ground Hog" Model 11099, both made by Garrett Electronics. Housing 32 is preferably detachably attached to the handle means 14 but may also be permanently affixed. In FIG. 6, plastic collar 46 is fixedly attached to tube 47 by mechanical fasteners 49 and 51. Tube 47 is fixedly attached to housing 32 and is typically found with all commercially available housings. A reinforcement sleeve 45 preferably of metal engages the inside of collar 46 and handle 14 tightly engages by friction the outside of collar 46. Hose clamps (not shown) may also be used to further ensure positive frictional engagement by compressively engaging the outside of the portion of handle 14 engaging the collar 46. It should be understood that any conventional manner of detachable attachment of the handle 14 to housing 32 is within the scope of the present invention.

In one particularly successful embodiment, basket 12 was approximately 8 inches in diameter with the side wall portion 22 made of 8 inch polyvinylchloride conduit and the top portion 20 made of a plastic bucket which was fixedly attached to the conduit by means of nylon screws 43. Handle 14 was made from standard 1½ inch diameter polyvinylchloride having approximately a 77 inch length, however, any length sufficient to allow use of the metal detection coil and basket below water level could be used. Collars 36 and 46 were standard 1½ inch collars used to fixedly hold 1½ inch conduit in place. It should be understood that these dimensions are given by way of example, and the size of the unit may vary according to the size of the metal detection coil used, articles hunted, and the type of area where the apparatus is being used.

In operation, the metal detection apparatus is held with the metal detection coil 16 and the open bottom 24 of the basket 12 facing downwardly as shown by reference numberal 48 in FIG. 5. The apparatus is preferably held at approximately a 45 degree angle and blade 26 is glided over bottom 50 of water 52 while moving the apparatus 10 from side to side in a zig-zag pattern in a first search position—that is with the metal detection coil 16 approximately parallel to the open bottom of the basket 12 as shown in FIGS. 2 and 5. When the magnetic field of coil 16 is disturbed by the presence of a metal object, this condition is identified by the detection circuitry within housing 32, which in turn transmits the signal to the operator 60. In general, the operator 60 then stops at that spot and puts pressure down on the basket 12, and pulls the apparatus 10 toward the operator 60 with the blade portion 26 scooping and filling basket 12 with material and (hopefully) metal objects. The metal detection coil 16 pivots to the second position, as shown by the sequence of positions 54,56 in FIG. 5 within basket 12 as the basket 12 fills with material. The operator 60 can then further pull basket 12 toward him and out of the water with handle 14 approximately perpendicular to the ground where subsequently the detected object may be removed from the interior of basket 12 without the operator 60 having to reach under water to pick up the object. The coil 16 can then be positioned back into the search position by hand or by quick submersion in the water for resumption of further metal detection. Thus by using the apparatus 10 of the present invention a metal object may be located and dug out without losing its location, even in fairly deep water, and with practice, the operator is able to detect when the object is within the basket 12 due to the signal being transmitted by the metal detection coil 10.

The present invention enables a nonswimmer to search for coins and rings in the water, since the apparatus 10 may double as a third leg and a feeler checking the depth and assisting the balance of operator 60. The apparatus 10 may also be placed on a float alongside operator 60 while scanning the bottom of a body of water. One embodiment of the present invention was even used through a hole in ice in 9 to 13 feet of water with sources thereby extending the searching season for metal detection enthusiasts into winter.

The metal detection apparatus 10 can be used to retrieve gold nuggets from stream beds. The apertures 28 in basket 12 may be eliminated or varied in location, size and number and aid in retaining any gold nuggets in the basket 12 against the flow of water.

CONCLUSION

The metal detection apparatus of the present invention allows metal items to be detected and immediately recovered without the operator having to bend over and pick up the item. Further, the present invention extends the use of metal detection into water covered areas so that the metal item may be detected and immediately retrieved into a basket without losing the location of the metal object. The preferred plastic composition of the apparatus makes the apparatus light in weight and durable. Additionally, the plastic does not affect the detecting ability of the coil as metal would. The blade portion and side wall portions do not have apertures which helps in removing any metal objects from within the basket while the apertures in the top portion allow the other material to quickly sift through. An experienced operator of the apparatus of the present invention is able to detect when the metal object has entered the basket, and with detachable attachment of the handle to th metal detection circuitry, various metal detection circuits and housings may be interchangeably used to suit the particular situation.

Although the present invention has been described with reference to preferred embodiments, persons skilled in the art will recognize that changes may be made in form and detail without departing from the spirit and scope of the invention.

What is claimed is:

1. Metal detection apparatus comprising:
   nonmetallic basket means having a top portion, a side wall portion, an open bottom, and a blade portion for scooping material into the basket means through the open bottom;
   handle means having a first end attached to the basket means;
   metal detection coil means for detecting metal objects; and
   pivotal mounting means for pivotally mounting the metal detection coil means with respect to the basket means and for holding the metal detection coil means in a first search position proximate and at least partially covering the open bottom for detection of metal objects, and for permitting the metal detection coil means to pivot to a second position within the basket means as the basket means fills with material.

2. The apparatus of claim 1 wherein the basket means is made of a plastic material.

3. The apparatus of claim 1 wherein the handle means is made of a plastic conduit of sufficient length to use the metal detection coil means and basket means below water level.

4. The apparatus of claim 1 wherein the pivotal mounting means is attached to the side wall portion proximate the handle means.

5. The apparatus of claim 5 wherein the blade portion extends from the side wall portion of a location farthest from the handle means.

6. The apparatus of claim 1 wherein the top portion of the basket means has a plurality of apertures to permit sifting of material within the basket means.

7. The apparatus of claim 1 further comprising metal detection circuitry for electrically powering and receiving signals from the metal detection coil means.

8. The apparatus of claim 7 wherein the metal detection circuitry is housed in a housing that is attached to a second opposite end of the handle means.

9. The apparatus of claim 8 wherein the housing is detachably attached to the handle means.

10. Metal detection apparatus comprising:
    nonmetallic basket means having a top portion, a side wall portion, an open bottom, with the top portion having a plurality of apertures to permit sifting of material within the basket means;
    handle means having a first end attached to the basket means;
    metal detection coil means for detecting metal objects; and
    pivotal mounting means for pivotally mounting the metal detection coil means with respect to the basket means and for holding the metal detection coil means in a first search position proximate and at least partially covering the open bottom for detection of metal objects, and for permitting the metal detection coil means to pivot to a second position within the basket means as the basket means fills with material.

* * * * *

UNITED STATES PATENT AND TRADEMARK OFFICE
CERTIFICATE OF CORRECTION

PATENT NO. : 4,359,686
DATED : Nov. 16, 1982
INVENTOR(S) : Kenneth Wherry

It is certified that error appears in the above-identified patent and that said Letters Patent is hereby corrected as shown below:

Claim 5, line 1, cancel "claim 5", and insert therefor --claim 4-- .

Signed and Sealed this

Twenty-fifth Day of January 1983

[SEAL]

Attest:

GERALD J. MOSSINGHOFF

Attesting Officer

Commissioner of Patents and Trademarks